(12) United States Patent
Suk et al.

(10) Patent No.: US 12,203,241 B2
(45) Date of Patent: Jan. 21, 2025

(54) EXCAVATOR INCLUDING UPPER SWING BODY HAVING FREE SWING FUNCTION

(71) Applicant: VOLVO CONSTRUCTION EQUIPMENT AB, Eskilstuna (SE)

(72) Inventors: Okjin Suk, Gyeongsangnam-do (KR); Chunhan Lee, Gyeongsangnam-do (KR)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 1151 days.

(21) Appl. No.: 16/964,319

(22) PCT Filed: Jan. 26, 2018

(86) PCT No.: PCT/KR2018/001196
§ 371 (c)(1),
(2) Date: Jul. 23, 2020

(87) PCT Pub. No.: WO2019/146817
PCT Pub. Date: Aug. 1, 2019

(65) Prior Publication Data
US 2020/0347577 A1    Nov. 5, 2020

(51) Int. Cl.
*E02F 9/22* (2006.01)
*E02F 9/12* (2006.01)
*E02F 9/26* (2006.01)

(52) U.S. Cl.
CPC ............ *E02F 9/2296* (2013.01); *E02F 9/123* (2013.01); *B60Y 2200/412* (2013.01);
(Continued)

(58) Field of Classification Search
CPC . E02F 3/32; E02F 9/2296; E02F 9/123; E02F 9/2058; E02F 9/128; E02F 9/2235;
(Continued)

(56) References Cited

U.S. PATENT DOCUMENTS

| | | | | |
|---|---|---|---|---|
| 5,709,083 A | * | 1/1998 | Sorbel | E02F 9/123 |
| | | | | 60/436 |
| 6,339,929 B1 | * | 1/2002 | Udagawa | E02F 9/123 |
| | | | | 60/468 |

(Continued)

FOREIGN PATENT DOCUMENTS

| EP | 1052413 A1 | 11/2000 |
|---|---|---|
| JP | 61-257542 A | 11/1986 |

(Continued)

OTHER PUBLICATIONS

International Search Report and Written Opinion of the International Searching Authority, PCT/KR2018/001196, mailed Oct. 26, 2018, 10 pages.

*Primary Examiner* — Adam J Behrens
*Assistant Examiner* — Blake E Scoville
(74) *Attorney, Agent, or Firm* — Sage Patent Group

(57) ABSTRACT

A system for enabling an upper swing body of construction equipment to swing freely. A working device is attached to the upper swing body to lift and move an object. A swing motor is connected to a power unit to swing the upper swing body. A controller is electrically connected to the working device and the swing motor to detect forces applied to the working device, and based on the detected forces, generating a control signal to control the swing motor so that the upper swing body swings freely. The system enables the upper swing body to swing freely to reduce energy consumption while ensuring safety when the upper swing body lifts a load.

7 Claims, 4 Drawing Sheets

(52) U.S. Cl.
CPC ............. *E02F 9/128* (2013.01); *E02F 9/2235* (2013.01); *E02F 9/2267* (2013.01); *E02F 9/265* (2013.01)

(58) Field of Classification Search
CPC ... E02F 9/2267; E02F 9/265; B60Y 2200/412
See application file for complete search history.

(56) References Cited

U.S. PATENT DOCUMENTS

| | | |
|---|---|---|
| 8,511,490 B2 | 8/2013 | Kawai et al. |
| 8,776,512 B2 * | 7/2014 | Lastre .................... B66C 23/86 60/436 |
| 8,959,918 B2 * | 2/2015 | Nishikawa ............ E02F 9/2004 180/65.21 |
| 2010/0139255 A1 | 6/2010 | Kamiya et al. |
| 2013/0245897 A1 | 9/2013 | Linstroth et al. |

FOREIGN PATENT DOCUMENTS

| | | | |
|---|---|---|---|
| JP | 01-156300 A | | 6/1989 |
| JP | 2015214808 A | * | 12/2015 |

* cited by examiner

[Fig. 1]
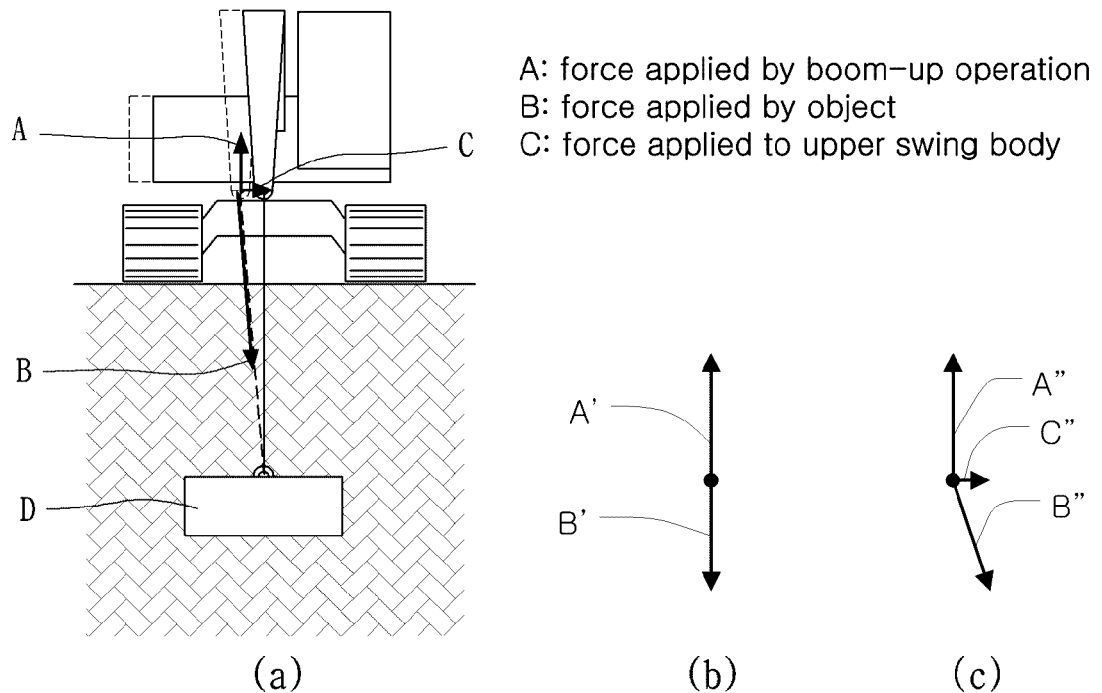
A: force applied by boom-up operation
B: force applied by object
C: force applied to upper swing body
(a) (b) (c)
[Fig. 2]
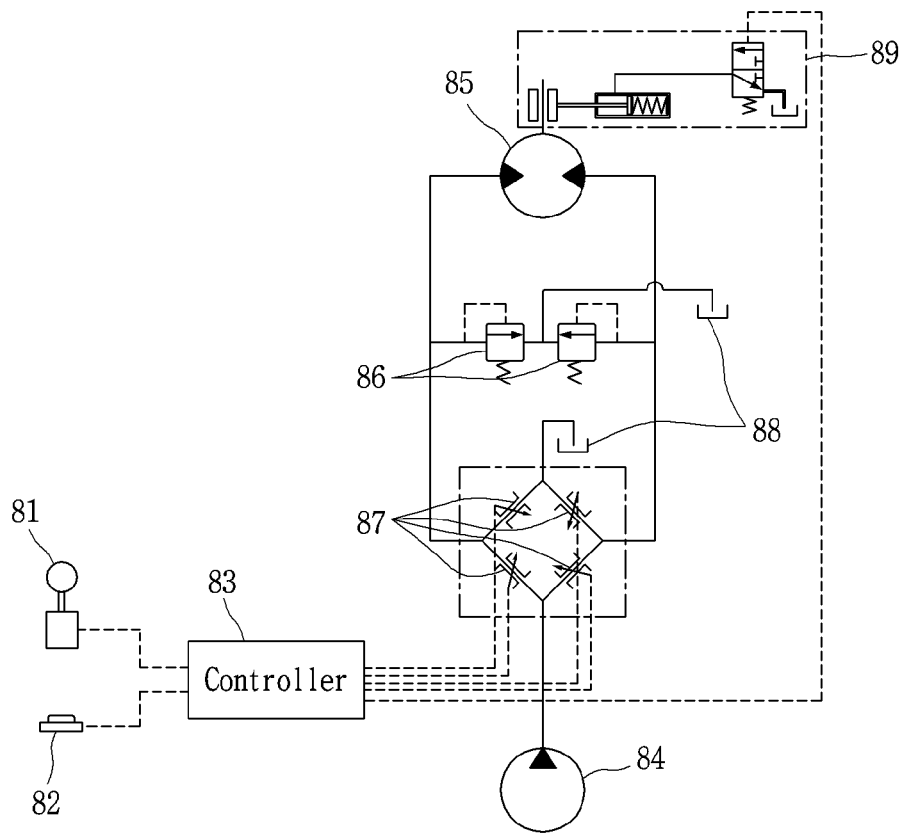

[Fig. 3]
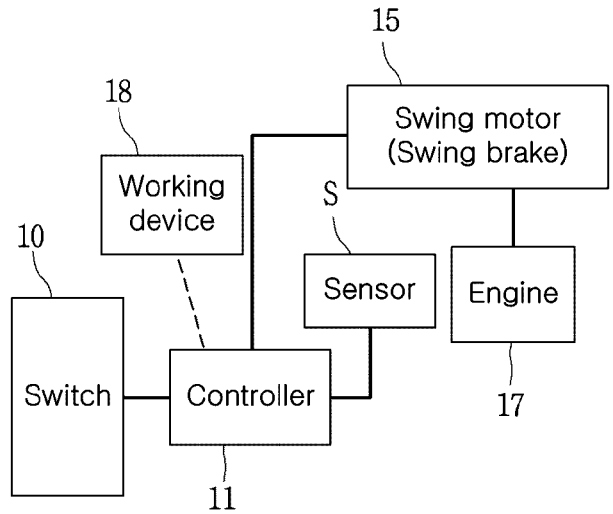
[Fig. 4]
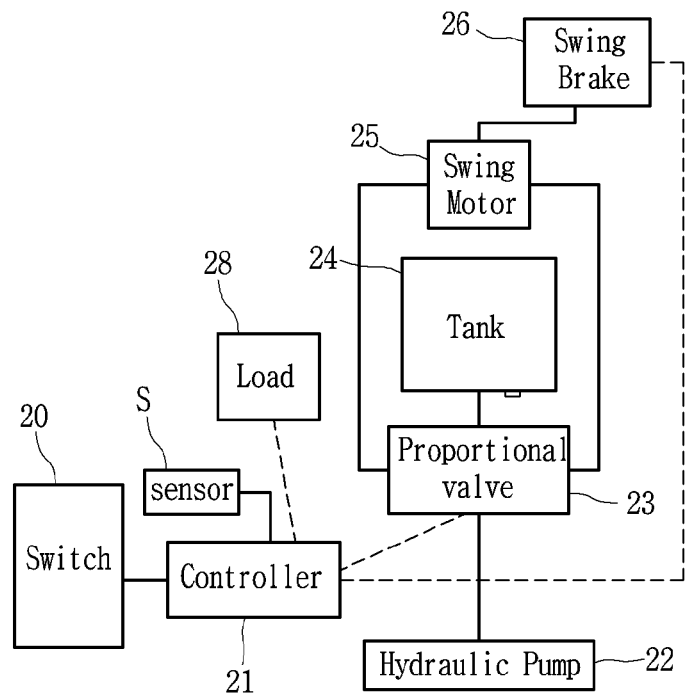

[Fig. 5]
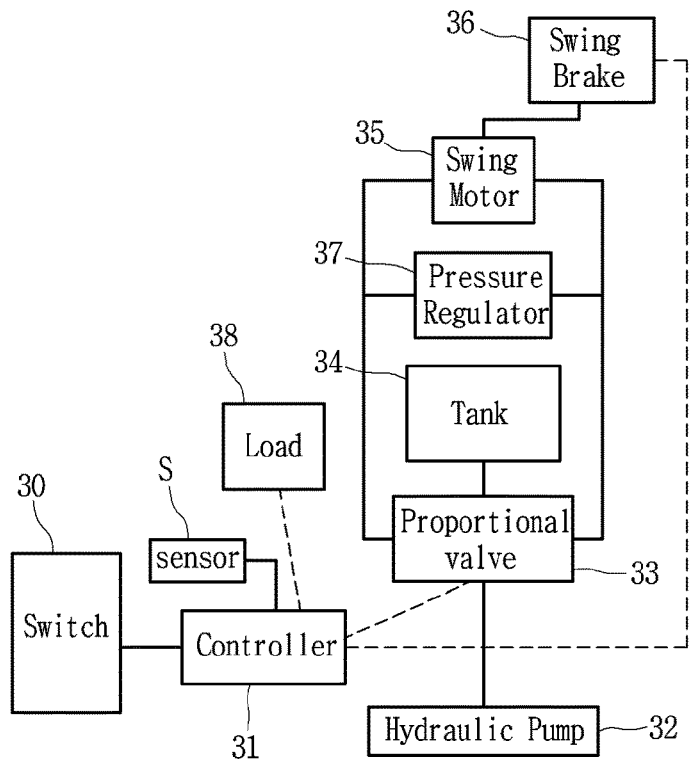
[Fig. 6]
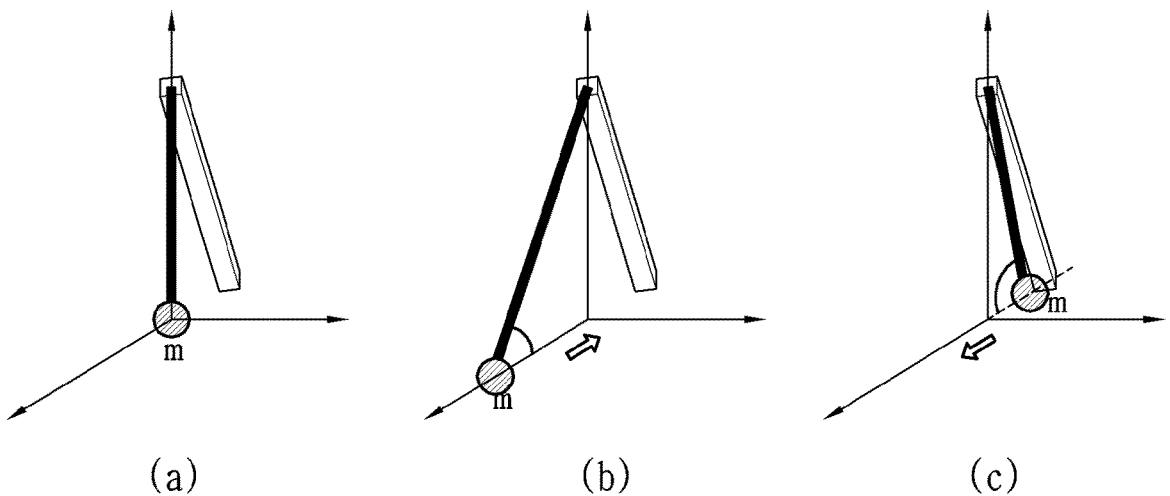
(a)          (b)          (c)

[Fig. 7]
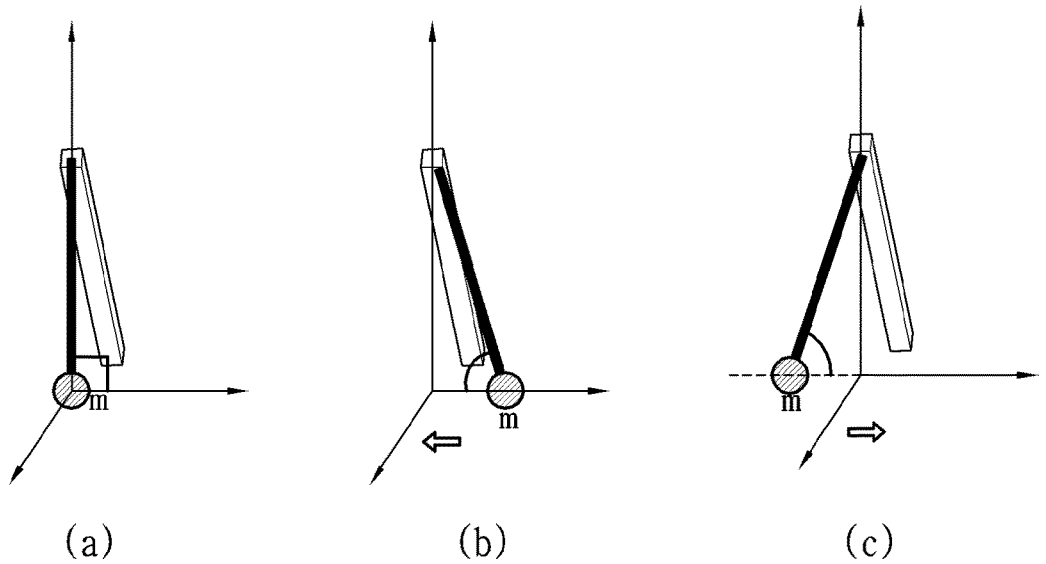
(a)          (b)          (c)
[Fig. 8]
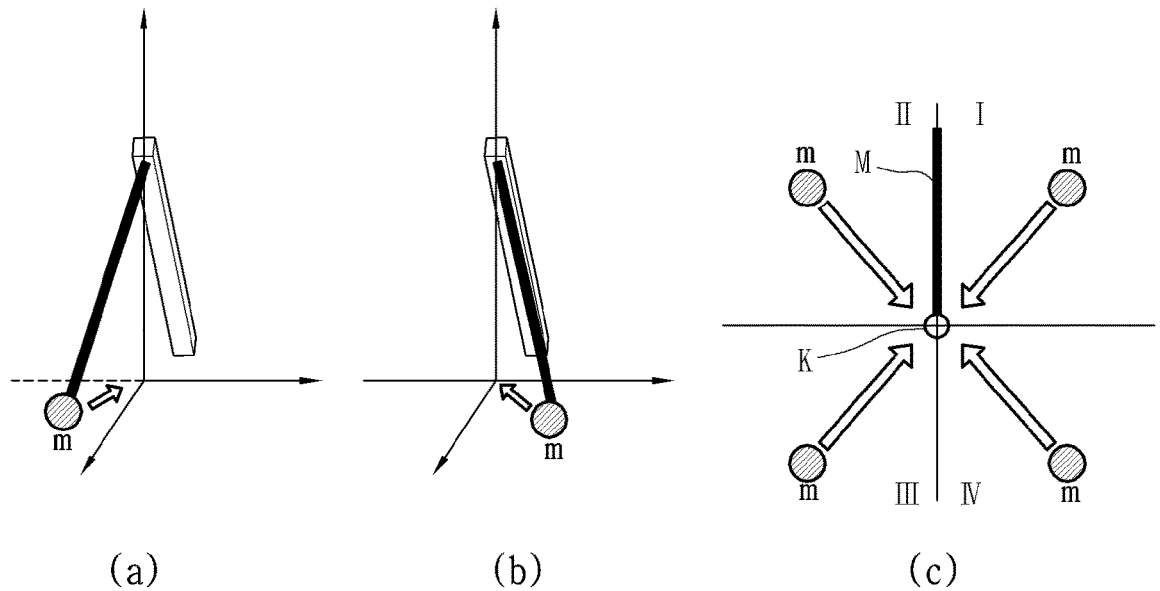
(a)          (b)          (c)

EXCAVATOR INCLUDING UPPER SWING BODY HAVING FREE SWING FUNCTION

CROSS REFERENCE TO RELATED APPLICATIONS

This application is a 35 U.S.C. § 371 national stage application of PCT International Application No. PCT/KR2018/001196 filed on Jan. 26, 2018, the disclosure and content of which is incorporated by reference herein in its entirety.

TECHNICAL FIELD

The present disclosure relates to an excavator, and more particularly, to an excavator having a function of enabling an upper swing body to swing freely to reduce energy consumption while ensuring safety when the upper swing body lifts a load.

BACKGROUND ART

In the related art, during operations of an excavator, a heavy object, such as a pipe, is often connected to a bucket using a rope while being lifted. Such an operation requires a significant amount of attention for the following reasons. When a boom is operated in an unsuitable position, a heavy object may move in an unexpected manner. (For example, the boom may accidently swing in the air while being lifted.) Such an unexpected motion of an object leads to concerns for accidents, such as injury to persons around heavy equipment (such as an excavator) and damage to heavy equipment.

In addition, an increase in the swing of the boom may increase the risk that the heavy equipment (such as an excavator) may be overturned and an operator of the heavy equipment may consequently be injured.

When the object is not being directly vertically lifted from the position in which the object is located, the heavy equipment may be required to apply a greater amount of force, so that a greater amount of energy may be consumed. In addition, since a plurality of precise swinging operations must be performed to lift an object vertically, the operator must concentrate for an extended period of time. However, despite of such efforts of the operator, the equipment may not be correctly aligned while the operation is being performed, thereby causing dangerous situations and wastage, as described above.

DISCLOSURE

Technical Problem

Accordingly, the present disclosure has been made in consideration of the above-described problems occurring in the related art, and the present disclosure proposes a configuration allowing an upper swing body of an excavator to swing freely in response to force to prevent dangers and wastage during a load lifting operation.

Technical Solution

According to an aspect of the present disclosure, provided is a system for enabling an upper swing body of construction equipment to swing freely, the construction equipment including a lower travel body and the upper swing body located on the lower travel body. The system may include: a working device attached to the upper swing body to lift and move an object; a power unit; a swing motor connected to the power unit to swing the upper swing body; and a controller electrically connected to the working device and the swing motor to detect forces applied to the working device, and based on the detected forces, generating a control signal to control the swing motor so that the upper swing body swings freely.

Also provided is a system for enabling an upper swing body of construction equipment to swing freely, the construction equipment including a lower travel body and the upper swing body located on the lower travel body. The system may include: a working device attached to the upper swing body to lift and move an object; a hydraulic pump; a swing motor swinging the upper swing body; a swing brake controlling the swinging of the swing motor; an electric proportional valve connected to the hydraulic pump to control free swinging of the swing motor; a tank connected to the electric proportional valve and containing hydraulic fluid for controlling the swing motor; and a controller connected to the swing brake and the electric proportional valve to generate a control signal for free swinging of the upper swing body.

The system may further include a pressure regulator connected to the swing motor and the electric proportional valve to prepare for an abnormal increase in pressure.

The system may further include sensors detecting magnitudes and directions of forces applied to the working device and transmitting detected data to the controller.

The system may further include a free swing switch connected to the controller to turn a free swing function of the upper swing body on or off.

The controller may generate the control signal based on the forces and the sizes of the forces detected by the sensors.

When the free swing switch is on, the swing motor may be deactivated in response to the control signal being input thereto, so that the upper swing body is enabled to swing freely.

When the free swing switch is on, the electric proportional valve may be deactivated in response to the control signal being input thereto, so that the upper swing body is enabled to swing freely.

The upper swing body may swing freely to a point at a predetermined distance from an aligned position and may be swung by the swing motor from the point to the aligned position instead of swinging freely.

When a resultant force detected by the sensors is applied to the working device in a forward or backward direction instead of in a left or right direction, the controller may generate a control signal for instructing the working device to move in a direction in which the resultant force is removed.

Advantageous Effects

Applications of the present disclosure can improve the safety of persons around an excavator, as well as the safety of the excavator, during a load lifting operation of the excavator.

In addition, the present disclosure can reduce the waste of energy by the excavator.

DESCRIPTION OF DRAWINGS

FIG. 1A is a conceptual view illustrating force by which an upper swing body having a free swing function according to exemplary embodiments is caused to swing;

FIG. 1B illustrates a case in which force related to the swing of the upper swing body according to exemplary embodiments is 0;

FIG. 1C illustrates a case in which force related to the swing of the upper swing body according to exemplary embodiments is not 0;

FIG. 2 is a conceptual view illustrating an excavator including an upper swing body having a free swing function according to exemplary embodiments;

FIG. 3 is a block diagram illustrating a configuration of an electric excavator including an upper swing body having a free swing function according to exemplary embodiments;

FIG. 4 is a block diagram illustrating a configuration of a hydraulic excavator including an upper swing body having a free swing function according to exemplary embodiments;

FIG. 5 is a block diagram illustrating a configuration further including a pressure regulator, in addition to the configuration illustrated in FIG. 4;

FIG. 6A illustrates a position before an upper swing body having a free swing function according to exemplary embodiments lifts a load m;

FIG. 6B illustrates a case in which the load m to be lifted is located outwardly of a vertical direction and is thus forced toward the excavator;

FIG. 6C illustrates a case in which the load m to be lifted is located inwardly of the vertical direction and is thus forced outwardly of the excavator;

FIG. 7A illustrates a position before an upper swing body having a free swing function according to exemplary embodiments lifts a load;

FIG. 7B illustrates a case in which the load to be lifted is located to the left of a vertical direction when viewed from the excavator;

FIG. 7C illustrates a case in which the load m to be lifted is located to the right of the vertical direction when viewed from the excavator and is thus forced toward the center;

FIG. 8A illustrates a case in which a load m to be lifted by an upper swing body having a free swing function is located to the right, outward of a vertical direction, when viewed from the excavator;

FIG. 8B illustrates a case in which the load m to be lifted is located to the left, outward of the vertical direction, when viewed from the excavator; and FIG. 8C is a top view illustrating a direction in which the load is forced when the load is lifted, depending on the position of the load to be lifted with respect to the vertical direction of the working device.

MODE FOR INVENTION

The term "excavator" used herein means a typical excavator that is currently used, while the term "hydraulic excavator" used herein means a typical excavator that is currently used, actuated by hydraulic pressure. The term "electric excavator" used herein means an excavator, the arm of which is actuated using electricity, instead of hydraulic pressure. The configuration and operation of the electric excavator are substantially the same as those of the hydraulic excavator, with the components related to hydraulic pressure being omitted from the configuration of the electric excavator.

The present disclosure will be described in detail with reference to the accompanying drawings.

FIGS. 1A to 1C illustrate an exemplary excavator operation in a system to which the present disclosure is applied. FIGS. 1A to 1C illustrate a boom-up operation of an upper swing body of an excavator, in which the upper swing body lifts a heavy object D with a rope fixed to one end of an arm (a working device) and to a heavy object D when the object D is not located in an aligned position (in a vertical direction). Herein, the aligned position refers to a position in which the object D and the working device (e.g. the arm) are aligned in the vertical direction. In FIG. 1A, reference numeral A indicates a force of lifting the object D, B indicates a force applied by the object that is not located in the aligned position while being lifted, and C indicates a resultant force generated by the force A and the force B. (Of course, while lifting the object D, the rope is stretched tight)

FIG. 1B illustrates a case in which an object is lifted by forces A' and B' and a force for laterally moving the object is not generated, since the object is located in the aligned position, while FIG. 1C illustrates a case in which a lifting force A" and a pulling force B?, generated by an object, form a resultant force C", since the object is not located in the aligned position. In this case, due to physical laws, an upper swing body freely stops swinging at a point at which the resultant force C" is terminated. Then, the end of the arm (i.e. a location from which the rope is suspended) and the object are located on a vertical line. Hereinafter, this position will be referred to as the aligned position.

When the force C" is generated as illustrated in FIG. 1C, a boom-up operation performed by an excavator including an upper swing body having a free swing function can bring the upper swing body into the aligned position with respect to the object.

This case will be described in detail as follows.

When the object D is lifted vertically as illustrated in FIG. 1B, a force $F_{material}$ acting vertically downwardly on the object D is equal to a product mg of a mass m of the object D and gravitational acceleration g, as is apparent from physical laws. Thus, the arm (working device) can only lift the object D by pulling the object D upwardly with a force greater than the force $F_{material}$. However, as illustrated in FIG. 1A or 1C, in the case in which the object is not in the aligned position, when the upper swing body is released from the fixed position to be able to swing freely, the upper swing body of the excavator swings freely to a position corresponding to the object by the force applied by the object before a force applied by the excavator to lift the object exceeds the force applied by the object, so that the upper swing body of the excavator is aligned with the object.

A configuration for enabling such free swinging will be described below with reference to FIG. 2.

When a free swing on/off switch 82 for the upper swing body is turned on, an electric proportional control valve 87 in a closed position, located between port A of a swing motor 85 and a tank 88 and an electric proportional control valve 87 in a closed position, located between port B of the swing motor 85 and the tank 88, are moved to open positions by set values, and a swing brake 89 is released. Consequently, the swing motor 85 enables free swinging, in response to an operator manipulating a boom-up input device 81.

For example, as illustrated in FIG. 1A, when the arm (working device) of the upper swing body is located to the right of the object when viewed from the operator, a boom-up operation may be performed by turning on the upper body free swing on/off switch 82. In this case, the upper swing body swings to the left to be aligned with the object, a flow of hydraulic fluid made up in the tank 88 is supplied to the swing motor 85 via the electric proportional control valve 87 between the tank 88 and port B of the swing motor 85, set to be open, and a flow of hydraulic fluid discharged by the swing motor 85 returns to the tank 88 via the electric proportional control valve 87 between port A of the swing motor 85 and the tank 88, set to be open.

FIGS. 4 and 5 illustrate configurations for the upper swing body having a free swing function in the above-described hydraulic excavator. The configurations will be described as follows.

During an operation of lifting an object connected to a working device 28 or 38 of the excavator, in a state in which forces are applied to the object, even though the object has not yet been lifted, a free swing switch 20 or 30 is turned on. When sensors S detects forces applied to the working device as described above, a controller 21 or 31 determines that free swinging is necessary.

When free swinging is determined to be necessary, the controller 21 or 31 generates control signals and transmits the control signals to a swing brake 26 or 36 and a swing motor 25 or 35. When the control signals are received, the swing brake releases a braking function, and the swing motor can swing freely in the direction in which a resultant force is applied, based on a hydraulic action as described above.

FIG. 5 illustrates a configuration further including a pressure regulator, in addition to the configuration illustrated in FIG. 4. The pressure regulator 37 may be a pressure-regulating relief valve for preparing for an abnormal increase in pressure.

FIG. 3 illustrates a configuration of the upper swing body having a free swing function in an electric excavator that does not use hydraulic pressure. Described with reference to the configuration illustrated in FIG. 3, during an operation of lifting an object by connecting the object to a working device 18 of an excavator, in a state in which forces are applied to the object although the object is not yet lifted, a free swing switch 10 is turned on. In response sensors S detecting forces applied to the working device, a controller 11 determines that free swinging is necessary.

When free swinging is determined to be necessary, the controller 11 generates a control signal and transmits the control signal to a swing motor 15. When the control signal is received, the swing motor 15 unlocks from an engine, so that free swinging can be performed in the direction in which a resultant force is applied.

As described above, the free swinging operation allows the working device (arm) to swing freely to an aligned position by detecting physical forces. However, in actuality, the arm may not be able to accurately move to the aligned position, due to friction or the like. Thus, when the working device has almost moved to the aligned position, a final movement of the working device to a point at which no lateral swinging force occurs is performed by driving the swing motor using the sensors S. In this case, the distance of the final movement may be previously determined to be a predetermined value, in consideration of the characteristics and conditions of the excavator.

FIG. 6A illustrates a case in which an object connected to the working device is in alignment with the object on a vertical line, FIG. 6B illustrates a case in which an object connected to the working device is located away from the working device, with respect to the vertical line, and FIG. 6C illustrates a case in which an object connected to the working device is located adjacently to the working device, with respect to the vertical line. In this case, even if a free swing switch is turned on, no free swinging is performed, and the working device (arm) is moved outward (in a forward direction) in the case of FIG. 6B and inward (in a backward direction) in the case of FIG. 6C to offset pulling force caused by an object.

FIGS. 7A, 7B, and 7C illustrate cases in which a free swing function is necessary. FIG. 7A illustrates a case in which no free swinging to an aligned position is performed when the free swing switch is turned on, FIG. 7B illustrates a case in which swinging to the left of the working device (excavator) is performed when the free swing switch is turned on, and FIG. 7C illustrates a case in which swinging to the right of the working device (excavator) is performed when the free swing switch is turned on.

FIGS. 8A, 8B, and 8C illustrate cases in which the cases of FIGS. 6A to 6C are combined with the cases of FIGS. 7A to 7C. In the cases illustrated in FIGS. 8A to 8C, the working device (upper swing body) not only swings laterally but also moves inwardly or outwardly.

Referring to FIG. 8C, forces generated in relative positions of an object K with respect to the position of the working device M are indicated with arrows, respectively. When the free swing switch is turned on, the working device and the upper swing body move in the direction in which the respective arrows are removed (e.g. move to the left or right or inwardly or outwardly).

In the case in which both a lateral swing and an inward or outward movement are required, when the free swing switch is turned on, the working device (arm) may primarily perform free swinging to the left or right and then move inwardly or outwardly. However, this is not necessarily required and the sequence may be varied.

DESCRIPTION OF REFERENCE NUMERALS OF DRAWINGS

10, 20, 30, 82: switch 11, 21, 31, 83: controller
15, 25, 35, 85: swing motor 17: engine (power unit)
18, 28, 38: working device 22, 32, 84: hydraulic pump
26, 36, 89: swing brake 23, 33, 87: proportional valve
24, 34, 88: take
37, 86: pressure regulator (relief valve)
81: boom-up input device S: sensor

The invention claimed is:

1. A system for enabling an upper swing body of construction equipment to swing freely, the construction equipment including a lower travel body and the upper swing body located on the lower travel body, the system comprising:
a working device attached to the upper swing body to lift and move an object;
a hydraulic pump;
a swing motor swinging the upper swing body;
a swing brake controlling the swinging of the swing motor;
a tank containing hydraulic fluid for controlling the swing motor
an electric proportional valve connected to the hydraulic pump, the tank, and the swing motor to control swinging of the swing motor; and
a controller connected to the swing brake and the electric proportional valve, the controller configured to generate a control signal for free swinging of the upper swing body to control the swing brake and the electric proportional valve to enable the swing motor to swing freely when the controller determines that, during an operation in which the working device lifts and moves the object, the object is not located in an aligned position in which the object and the working device are aligned in a vertical direction.

2. The system of claim 1, further comprising a pressure regulator connected to the swing motor and the electric proportional valve to prepare for an abnormal increase in pressure.

3. The system of claim 1, further comprising sensors detecting magnitudes and directions of forces applied to the working device and transmitting detected data to the controller.

4. The system of claim 3, wherein the controller generates the control signal based on the directions of the forces and the magnitudes of the forces detected by the sensors.

5. The system of claim 1, further comprising a free swing switch connected to the controller to turn a free swing function of the upper swing body on or off.

6. The system of claim 1, wherein the upper swing body swings freely to a point at a predetermined distance from the aligned position and is swung by the swing motor from the point to the aligned position instead of swinging freely.

7. The system of claim 3, wherein, when a resultant force detected by the sensors is applied to the working device in a forward or backward direction instead of in a left or right direction, the controller generates a control signal for instructing the working device to move in a direction in which the resultant force is removed.

* * * * *